July 22, 1958 — R. H. MEIER — 2,844,011

SHAFT COUPLING

Filed March 10, 1955

INVENTOR.
R. H. MEIER

United States Patent Office 2,844,011
Patented July 22, 1958

2,844,011

SHAFT COUPLING

Robert H. Meier, Des Moines, Iowa, assignor to Deere Manufacturing Co., Dubuque, Iowa, a corporation of Iowa Application March 10, 1955, Serial No. 493,351

2 Claims. (Cl. 64—1)

This invention relates to a shaft coupling and more particularly to a coupling for use in interconnecting a pair of coaxial shafts projecting toward each other from rotor housings or the like.

The invention finds particular utility in the pneumatic conveying system of a mechanical mobile cotton picker of the type in which cotton is picked from the field by a pair of picking mechanisms and each picking mechanism has a conduit connected to a separate blower fan. In a representative construction, the blower fans are arranged coaxially and are driven by a common sheave connected to a split shaft carrying at its opposite ends the rotors or fans within the rotor housings. Because of the integration of the rotor housings and supporting structure, it is difficult to mount and dismount an endless drive belt without considerable dismantling of the structure. According to the present invention, the split shafts are interconnected by a novel coupling enabling exposure of a belt-receiving gap between the axially spaced apart terminal ends of the rotor shafts. It is a feature of the invention to provide a coupling in which one shaft has a pilot portion serving to pilot the separable half of the coupling. The invention features further the use of a splined shaft on which a coupling part is axially slidable, the coupling part being axially split so as to facilitate axial shifting for exposing the belt-receiving gap.

The foregoing and other important objects and features inherent in and encompassed by the invention will become apparent as a preferred embodiment of the invention is disclosed in detail in the following specification and accompanying sheet of drawings, the several figures of which will be described immediately below.

Figure 1:
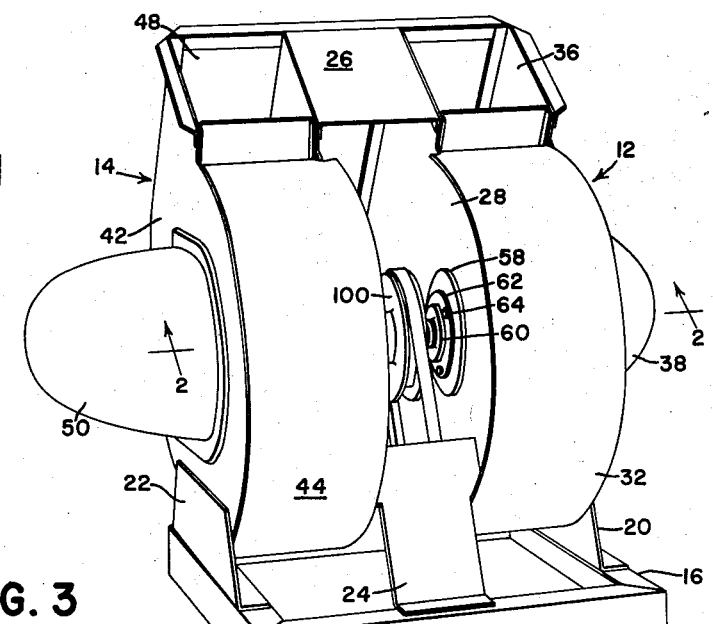
Fig. 1 is a perspective view of a dual rotor housing arrangement embodying the invention.
Figure 3:
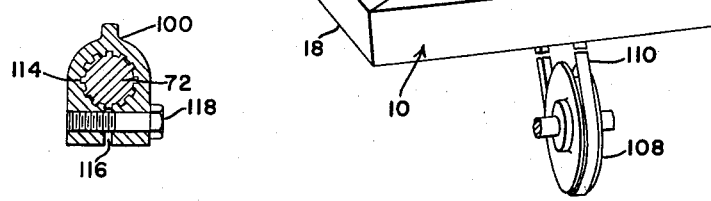
Fig. 3 is a transverse sectional view as seen along the line 3—3 of Fig. 2.

The U. S. patent to Paradise, 2,649,677 illustrates a mobile mechanical cotton picker of the type employing a pneumatic conveying system for carrying the picked cotton to a receptacle. Although that patent discloses a picker of the two-row type, the adaptation of the present invention thereto for use in a one-row picker will be readily apparent.

A machine of the type illustrated in the patent just referred to includes supporting structure, part of which is shown here and identified generally by the numeral 10. Rigidly mounted on the supporting structure are first and second rotor housings 12 and 14, the supporting structure having first and second end members 16 and 18 and supporting plates 20 and 22. The housings 12 and 14 are arranged in coaxially spaced apart relation and are rigidly maintained in that position by intervening plates 24 and 26.

The rotor housing 12 has inner and outer radial walls 28 and 30, respectively, and an annular or peripheral wall 32 defining a scroll-shaped space, as is conventional, about a first rotor 34. The housing has a tangential discharge duct 36 and an axially directed intake elbow 38.

The other rotor housing 14 is symmetrically constructed, having an inner radial wall 40, an outer radial wall 42 and a peripheral wall 44 encircling a rotor 46 and leading to a discharge duct 48. Material is directed into the rotor housing 14 via an intake elbow 50.

The rotor 34 has a central hub 52 which is internally splined to receive the splined outer end of a first rotor shaft 54. The wall 28 is centrally apertured at 56 and a reenforcing ring 58 is welded to the wall in register with the aperture, the ring and the wall carrying a self-aligning bearing 60 by means of a double-thickness flanged carrier 62, mounting of which on the wall 28 and ring 58 is accomplished as by bolts 64. The shaft 54, externally of the housing 12, is shouldered at 66 to abut the inner race of the bearing 60. A spacer 68 intervenes between the inner race of the bearing and the proximate side of the rotor hub 52, the bearing 60 serving as a combination thrust and radial-load bearing. Nuts 70 threaded onto the end of the rotor shaft 54 secure the rotor to the shaft and mount the shaft in the bearing 60 for rotation but the shaft is constrained against axial displacement relative to the housing because of its relationship to the bearing.

Corresponding structure may be found in the relationship of the rotor 46 to a second rotor shaft 72, the splined outer end of which is received in a rotor hub 74. A second self-aligning bearing 76 is carried at 78 on a ring 80 that is secured to the radial inner wall 40 of the housing 14 in register with an opening 82 in that wall. Bolts 84 are used to mount the carrier 78 and a shoulder 86 on the shaft and a spacer 88 between the inner race of the bearing 76 and the rotor hub 74 serve to prevent axial displacement of the shaft relative to the rotor or bearing. Nuts 89 at the end of the shaft 72 secure the rotor hub to the shaft. To the extent just described, the constructions at each side of a median plane between the housings 12 and 14 are symmetrical.

The first rotor shaft 54 carries thereon for rotation therewith and fixed against axial displacement relative thereto a connecting member or hub 90 having thereon a connecting portion in the form of a radial flange 92. The hub is preferably permanently united to the shaft 54 and its outer radial face 94 establishes a radial plane which abuts a complementary radial face 96 formed on the radial web 98 of a belt-receiving sheave 100, which sheave here serves as the second half of a coupling complementing the first half established by the hub 90. The radial flange 92 and sheave web 98 are respectively apertured in register, as at 102 and 104, and the sets of registering apertures respectively receive releasable securing means in the form of bolts 106. Because of the permanent connection of the hub 90 to the shaft 54, the radial face 94 establishes the location of the sheave 100 and therefore keeps it in alinement with a power input sheave 108 which is conventionally disposed remote from the supporting structure 10, as suggested in Fig. 1. A driving belt 110 is trained about the sheaves 100 and 108 to transmit power from the latter to the former.

From the description thus far, it will be seen that without separation of the hub 90 and sheave 100, it would be impossible to mount the belt 110 without dismantling the structure in some respects. According to the present invention, the dismantling is limited to axial separation of the hub 90 and sheave 100 so that a belt-receiving gap 112 is afforded between the inner terminal ends of the shafts 54 and 72.

The shaft 72 has its inner end portion externally splined, as at 114, to receive the internally splined central portion of the sheave 100, which portion is axially split at 116 and provided with clamping means, in the form of a cap screw 118, to afford selective tightening and relaxation of the sheave on the splined portion 114. When the clamping bolt 118 is loosened and the bolts 106 removed, the sheave 100 may be bodily shifted axially toward the housing 14, thus exposing the belt-receiving gap 112 and permitting the belt to be passed therethrough for mounting on or dismounting from the sheave 100. After the belt has been mounted, the sheave may be repositioned in its normal or connected position, the bolts 106 replaced, and the clamping bolt 118 tightened. Without the clamping means, it would be difficult to shift the sheave axially in the manner just noted.

Figure 2:
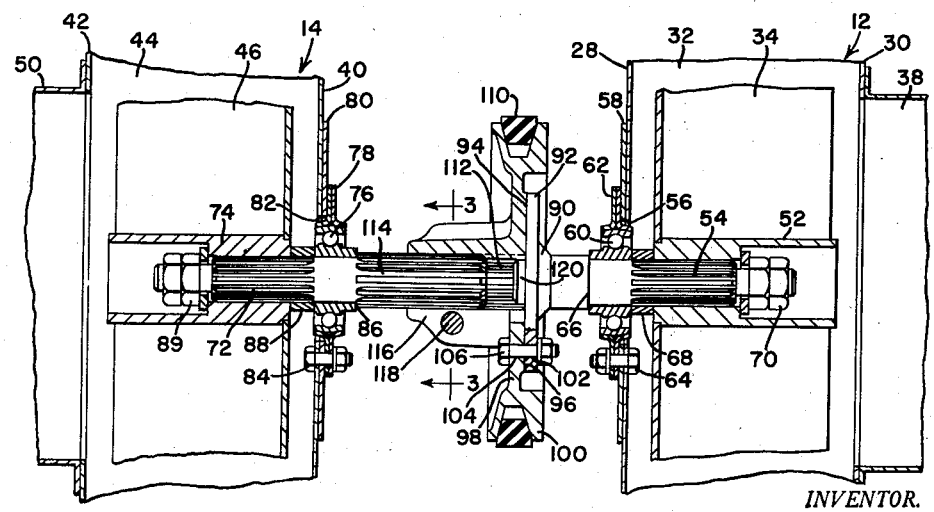
Fig. 2 is a fragmentary sectional view, on an enlarged scale, as seen substantially along the line 2—2 of Fig. 1.

The invention further features the novel arrangement in which the radial flange 92 on the hub 90 is spaced back axially from the terminal end of the shaft 54 so as to afford a pilot 120. When the sheave is in its normal or connected position as shown in Fig. 2, the proximate end portion of the internally splined bore thereof is piloted on the plit 120, thus contributing to the accuracy of the alinement of the shafts, which is important because of the use of the self-alining bearings at 60 and 76. Hence, when the parts are assembled and interconnected as shown in Fig. 2, the shafts 54 and 72 are in effect a solid shaft. The bolts 106 serve adequatedly as means for interconnecting the two in the transmission of torque thereof for rotation in unison and at the same time prevent axial separation of the hub and sheave. The clamp 118, in addition to permitting relaxation of the grip of the sheave on the shaft portion 114, serves, when tightened, to contribute to the axial non-displaceability of the sheave.

Various features of the invention not specifically enumerated herein will undoubtedly occur to those versed in the art, as will various modifications and alterations in the preferred embodiment of the invention disclosed, all of which may be achieved without a departure from the spirit and scope of the invention.

What is claimed is:

1. A shaft coupling connecting first and second rotor shafts projecting coaxially respectively from first and second coaxially spaced apart shaft supports and toward each other, and respectively having first and second terminal ends spaced axially apart to afford a belt-receiving gap, the shaft supports including first and second bearings journaling the shafts respectively in the supports and fixing the shafts against axial displacement relative to each other and to the supports, said coupling comprising: a hub fixed to the first shaft proximate to and axially back from the terminal end of the first shaft to expose an end portion of the shaft as a pilot, said hub having a connecting portion facing toward the second shaft; a sheave mounted on the second shaft adjacent the terminal end thereof and constrained for rotation with but axially slidable relative to said second shaft so as to be shiftable toward the hub to assume a connected position or, selectively, to be shiftable away from the hub to assume a disconnected position, the sheave in its connected position extending past the terminal end of the first shaft to receive the pilot so as to axially align the first and second shafts, and releasable securing means securing the sheave in its connected position to the connecting portion of the hub for interconnecting the shafts for rotation in unison, said means being releasable to enable axial shifting of the sheave to its disconnected position so as to expose the belt-receiving gap.

2. A shaft coupling connecting first and second rotor shafts projecting coaxially respectively from first and second coaxially spaced apart shaft supports and toward each other and respectively having first and second terminal ends spaced axially apart to afford a belt-receiving gap, the supports including first and second bearings journaling the shafts respectively in the supports and fixing the shafts against axial displacement relative to each other and to the supports, said coupling comprising first and second connecting members respectively on the first and second shafts at the terminal ends thereof and at axially opposite sides of said gap, one of said members including a concentric belt-receiving sheave; said first member being fixed to the first shaft and having a radial face facing toward the second member and said second member having a radial face facing toward and complementing said first member face, one of said members being fixed to its shaft for rotation therewith and constrained against axial displacement relative to its said shaft at a point spaced from the terminal end of its respective shaft to expose the latter as a pilot, and the other member being constrained for rotation with its shaft and having an integral split central portion with an external splined surface cooperative with a splined surface on its shaft, to be axially shiftable on the shaft so as to cause said other member to be movable from a normal position extending past the pilot on the other shaft and contacting said one member thereby blocking the belt-receiving gap to an axially separated position axially spaced from said one member and exposing said gap; clamping means operative selectively to clamp the split central portion rigidly to its shaft or to relax the portion on the shaft to permit axial movement of said other member; and releasable securing means normally securing the members together for rotation in unison and releasable to enable axial shifting of the shiftable member to its separated position.

References Cited in the file of this patent

UNITED STATES PATENTS

| 1,986,325 | Dallwigk | Jan. 1, 1935 |
| 2,010,796 | Bourque | Aug. 6, 1935 |

FOREIGN PATENTS

| 72,475 | Norway | Aug. 18, 1947 |

UNITED STATES PATENT OFFICE
CERTIFICATE OF CORRECTION

Patent No. 2,844,011                                        July 22, 1958

Robert H. Meier

It is hereby certified that error appears in the printed specification of the above numbered patent requiring correction and that the said Letters Patent should read as corrected below.

Column 4, line 34, for "external splined surface" read --internal splined surface--.

Signed and sealed this 14th day of October 1958.

(SEAL)
Attest:
KARL H. AXLINE                                                          ROBERT C. WATSON Attesting Officer                                                Commissioner of Patents